INVENTOR
Percival C Keith

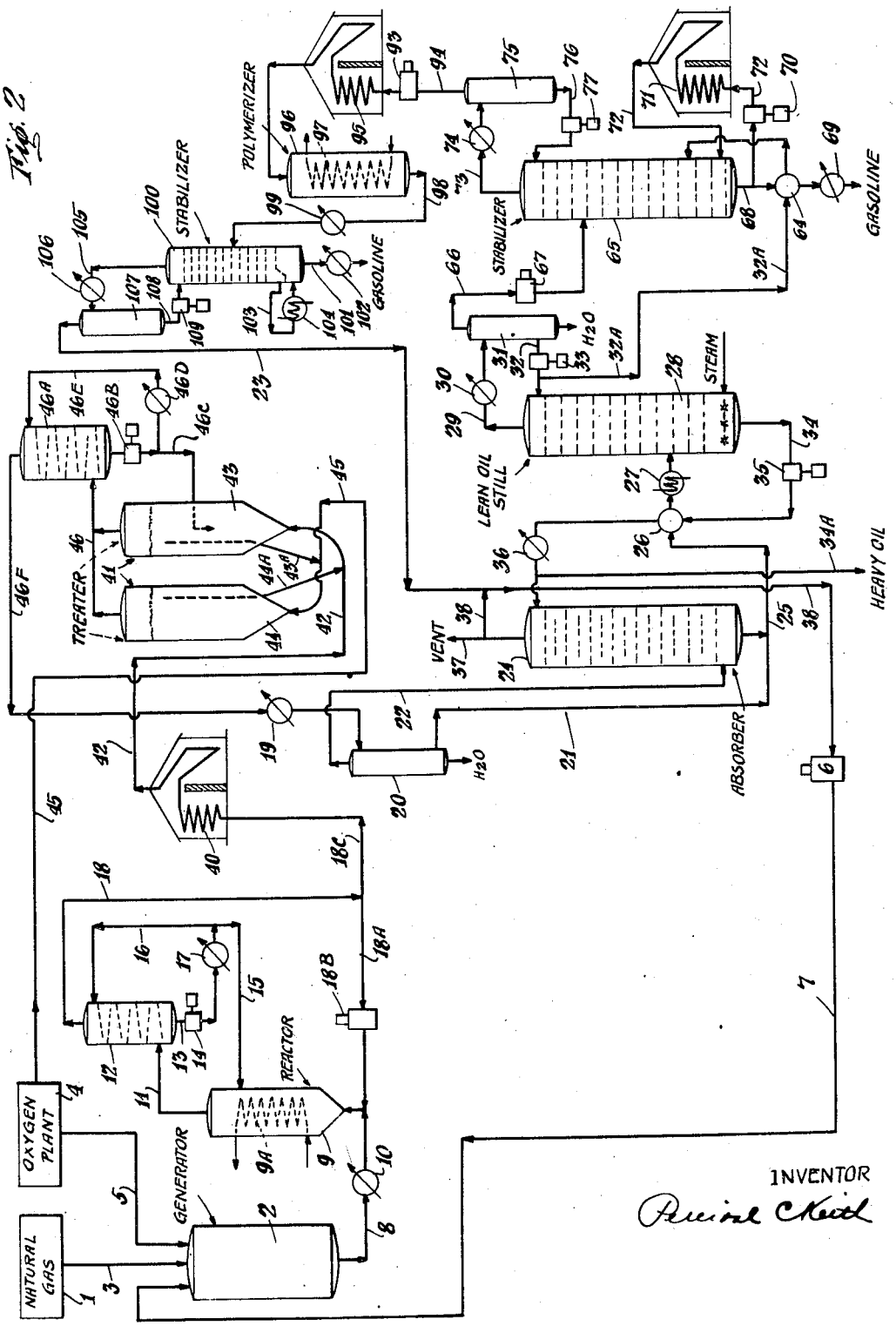

Patented May 17, 1949

2,470,216

UNITED STATES PATENT OFFICE 2,470,216

PROCESS FOR SYNTHESIZING MOTOR FUELS OF HIGH ANTIKNOCK VALUE

Percival C. Keith, Peapack, N. J., assignor to Hydrocarbon Research, Inc., New York, N. Y.

Application June 21, 1945, Serial No. 600,734

8 Claims. (Cl. 260—449.6)

This invention relates to the production of normally liquid hydrocarbons from a gaseous mixture consisting essentially of carbon monoxide and hydrogen. More particularly, the invention relates to the production of liquid motor fuel of high antiknock value.

The invention contemplates the utilization of normally gaseous hydrocarbons of low molecular weight, such as methane, ethane, etc., in the generation of synthesis gas, i. e., a mixture of carbon monoxide and hydrogen, the synthesis of hydrocarbons from such gas and the working up of the synthesis products to obtain a maximum yield of normally liquid hydrocarbons of which the major portion is a motor fuel of high antiknock value. The invention makes considerable point of maintaining a high efficiency of utilization of the gaseous hydrocarbon feed in terms of liquid hydrocarbons produced.

While several proposals have been made in the technical and patent literature of this field with respect to the synthesis of liquid hydrocarbons and their treatment to produce motor fuels of good antiknock value, to my knowledge, none has been found commercially attractive or even feasible. These proposals have been characterized by such shortcomings as expensive equipment, low yields, poor product quality and the like.

A prime object of my invention is to provide a novel and simple process for reacting carbon monoxide and hydrogen to form liquid hydrocarbons in the motor fuel range.

Another principal object is to provide a synthesis process in which the several steps are so integrated that the major product is a motor fuel or gasoline of high antiknock value and at the same time a high utilization efficiency of the gaseous hydrocarbon feed is realized.

Another object is to conduct the conversion of gaseous hydrocarbons to liquid hydrocarbons of high antiknock rating in a minimum of equipment which is simple and cheap.

Other objects of my invention will be apparent in the description which follows.

In accordance with my invention, a normally gaseous hydrocarbon, e. g., natural gas and refinery waste gases, is converted to synthesis gas, a mixture of carbon monoxide and hydrogen, by any of the known procedures which permit the recycling of carbon dioxide in order to form additional carbon monoxide. I prefer to conduct the conversion by the reaction of the gaseous hydrocarbon with controlled quantities of oxygen, a mixture of the gaseous hydrocarbon, oxygen and recycle gas being passed through a bed of granular refractory at a temperature in the vicinity of 2000° F. The synthesis gas is then passed through a reactor containing a catalyst selected from metals of the iron group. While the desired conditions of synthesis are generally well understood, great difficulty is experienced in attaining them in commercial-scale equipment. I have found it preferable, therefore, to conduct the synthesis step in accordance with the fluidization technique whereby the synthesis gas is passed up through a mass of powdered catalyst at such velocity that the powder is maintained in a suspended state without appreciable quantities of the powder being carried out of the reactor by the effluent gases. A desirable fluid reactor in which the synthesis step may be conducted is described in my co-pending application, Serial No. 575,417, filed January 31, 1945. The conditions imposed on the reactor are those which are known to produce a maximum of liquid hydrocarbons in the range of motor fuel.

An important phase of my invention is the treatment of the reaction products to stabilize them and to improve their antiknock value. For this purpose I integrate into my process a catalytic treating unit through which the reaction products are passed. As is known, the oil or hydrocarbon layer obtained from a catalytic synthesis process frequently contains as much as about 5% by weight of oxygen and rarely less than about 3%. The oxygen is present in the form of alcohols and other oxygenated compounds which remain dissolved in the oil layer when separated from the water of reaction which holds in solution an even larger proportion of oxygenated compounds. An oxygen content of about 3% by weight generally means that the oil contains about 10% by volume of alcohols and other oxygenated compounds. The presence of oxygenated compounds in a motor fuel is detrimental to both its stability and antiknock rating. Accordingly, from a commercial viewpoint, I find it imperative to treat such synthetic gasoline so that the oxygen in the product is eliminated. I have found that the passage of the synthetic oil in vapor phase through a mass of solid catalyst, e. g., activated alumina or bauxite, at temperatures above about 700° F. leads to the splitting off of oxygen from the oxygenated compounds and, consequently, to improvement of the gasoline stability and antiknock value. At temperatures of about 700° to 750° F., the catalytic treatment is essentially a dehydration operation, water being split out from the oxygenated compounds. As the temperature of this treatment is raised the dehydration is accompanied by an increasing amount of reforming or cracking of the product. Thus, at a temperature of about 950° F. the hydrocarbon fraction is not only deoxygenated but also materially reformed. The temperature selected for this catalytic treatment, generally in the range of about 700° to 950° F. and preferably in the range of about 800° to 900° F., depends upon the nature of the oil produced by the synthesis step and the quality of the motor fuel which is desired as end product. Such catalytic treatment to improve the motor fuel leads to the deposition of carbonaceous matter on the catalyst which must be removed in order to maintain catalyst activity. The regeneration of spent catalyst is conventionally conducted by burning the carbonaceous deposit with a stream of air. In my novel process, however, I have adopted substantially pure oxygen (i. e., not less than about 95° by volume of oxygen) as the regeneration gas so that the resultant flue gas from the regeneration step is essentially carbon monoxide and carbon dioxide, usually in the ratio of one volume of monoxide to two volumes of dioxide. This gas which contains all of the carbon laid down on the catalyst and which normally would represent a loss in the utilization of the gaseous hydrocarbon feed to the process, is in a form admirably suited for recycling to the synthesis gas generator. In this manner I effect a higher utilization efficiency for the gaseous hydrocarbon feed than has been possible by any prior process directed to the production of motor fuel of high antiknock value. As is known, the synthesis reaction produces both gaseous hydrocarbons, e. g., hydrocarbons in the range of $C_3$ and $C_4$, as well as heavier hydrocarbons beyond the ordinary range of motor fuels. The catalytic treating step, when carried at reforming or cracking conditions, has the added advantage of appreciably reducing the quantity of heavier hydrocarbons which, in fact, may be reduced to any desired limit. Generally it is advisable to conduct the catalytic treatment with such depth of cracking that substantially the only heavy hydrocarbon fraction above gasoline which remains is one that is utilizable as Diesel oil.

While in my process I rely on the catalytic treating step to deliver a motor fuel of high antiknock value and to curtail the production of heavy hydrocarbons, I usually also provide a polymerization step to produce an additional gasoline fraction from the normally gaseous hydrocarbons from the synthesis step. Any residual, unreacted hydrocarbon gases from this step are returned to the synthesis gas generator wherein they are utilized for the production of synthesis gas and in the subsequent synthesis step additional liquid hydrocarbons are formed. It is evident that the foregoing integration and interrelation of the several steps results in a process in which the gaseous hydrocarbon feed is converted to a major quantity of gasoline of high antiknock value and good stability and a minor quantity of valuable oil, e. g., Diesel grade, while attaining a high utilization efficiency for the gaseous hydrocarbon feed in terms of the liquid hydrocarbons produced.

To clarify further the operation of my process, reference is made to the attached diagrammatic flowsheets, of which:

Figure 2 is the flowsheet of a modified embodiment of my invention.

Figure 1:
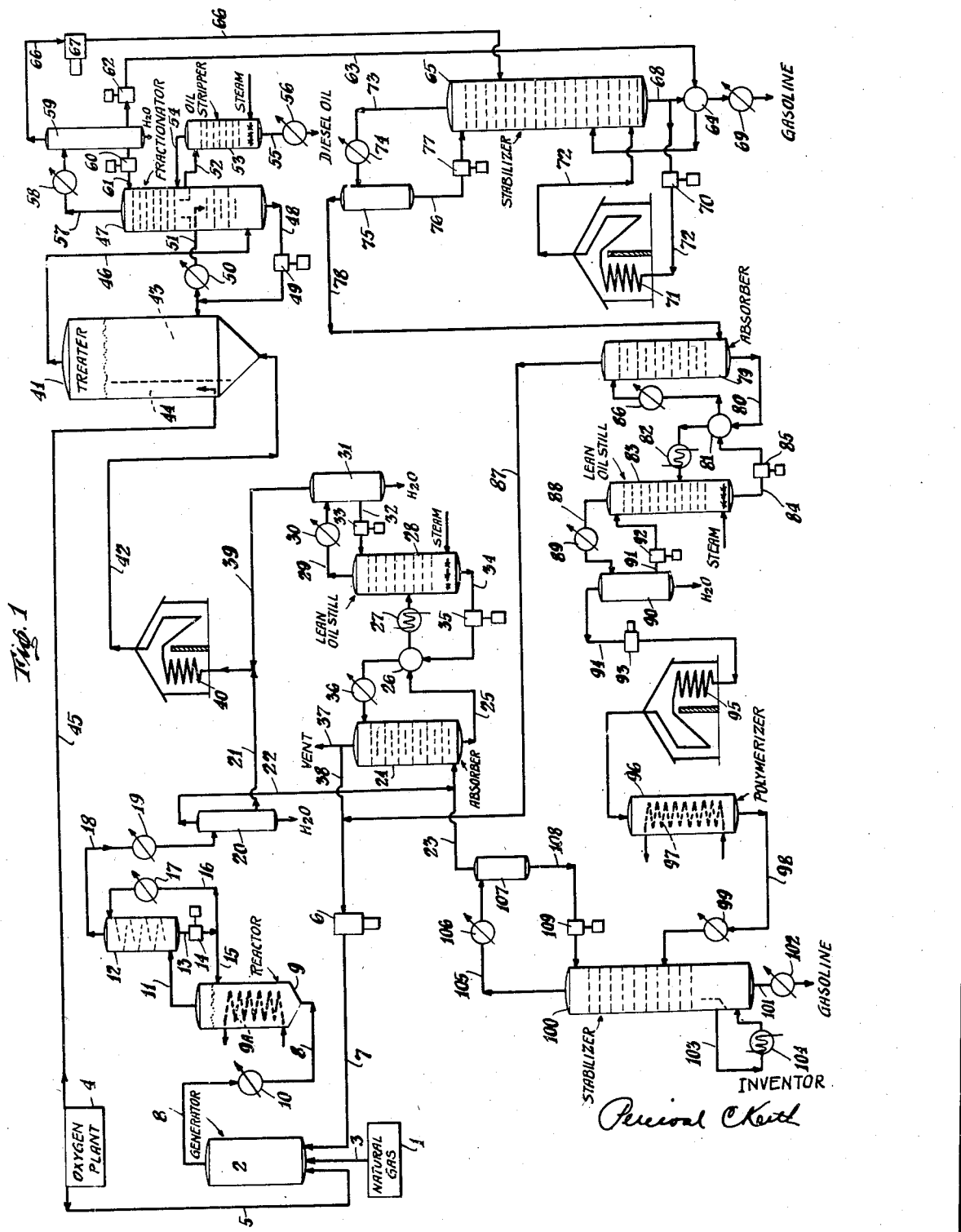
Figure 1 is the flowsheet showing a preferred embodiment of my invention.

Figure 1 shows schematically a plant in which the process of my invention may be carried out continuously. To simplify the presentation, all material flows will be given in terms of mols per hour. The compositions of the various streams are also given in terms of average molecular weights. A source 1 of natural gas containing about 90% methane supplies natural gas to generator 2 by way of line 3 at the rate of 580 mols. Simultaneously, an oxygen plant 4 supplies oxygen of about 98% purity to the generator 2 through line 5. The rate of flow of oxygen is 450 mols. Recycle gas comprising a major fraction of carbon dioxide and minor fractions of carbon monoxide, hydrogen, methane, etc., is pumped by compressor 6 into generator 2 by way of line 7 at the rate of 580 mols. The generator 2 may be of the type wherein the reacting gases pass through a bed of granular refractory, e. g., alundum, maintained at a temperature of about 2100° F. and a pressure of approximately 275 lbs. per square inch gauge. The resulting synthesis gas containing about 80% by volume of hydrogen and carbon monoxide in the ratio of 1.2 volumes of hydrogen to 1 volume of carbon monoxide and a remainder comprising moisture, carbon dioxide, nitrogen, etc., flows at the rate of 2600 mols through line 8 to reactor 9. The synthesis gas which has an average molecular weight of 16.3 passes through cooler 10 prior to entering reactor 9 so that its temperature is dropped to a level of about 600° F.

The synthesis reactor 9, operating at a pressure of about 250 lbs. per square inch gauge and a temperature of about 625° F., is preferably of the type in which powdered catalyst, e. g., iron, is suspended in an upward flowing stream of synthesis gas and forms a relatively dense, fluidized mass. With a fluidizing reactor, it is advisable to pass the gases through the fluidized catalyst mass at an average velocity of about 1 foot per second and to effect a contact time of 30 to 50 seconds. Powdered iron containing 2 to 3% of potassium oxide ($K_2O$) and alumina ($Al_2O_3$) as promoters is a desirable catalyst; preferably, all of the powder should pass through a 200-mesh screen and about 85% should pass through a 325-mesh screen. Sensitive temperature control is attained through a suitable heat exchange device 9A (a cooling coil is shown) disposed within the fluidized catalyst mass. The reaction gases leaving reactor 9 through line 11 are scrubbed in chamber 12 with a liquefied fraction of the reaction products so as to recover any entrained catalyst powder from the effluent gases. The oil-catalyst slurry draining from the bottom of chamber 12 through line 13 is forced by pump 14 partly back to reactor 9 by way of line 15 and partly through line 16 and cooler 17 to the top of chamber 12 to make the removal of catalyst powder from the effluent gases continuous. The scrubbed effluent gases pass through line 18 and a further cooler 19 into a flash drum 20 to effect a crude separation of products. The stream flowing into flash drum 20 has a rate of 1475 mols and an average molecular weight of 28.7. On the molar basis, nearly half of this product mixture is water of reaction and about one quarter of it is carbon dioxide. A water layer containing an appreciable quantity of alcohols and other oxygenated reaction products is drained from the bottom of drum 20. An upper oil layer is withdrawn through line 21 at the rate of 40 mols. This oil stream having a molecular weight of about 121 holds about 10–15% of dissolved carbon dioxide. The uncondensed gases with an average molecular weight of 31.6 flow at the rate of 790 mols from the top of drum 20 through lines 22 and 23 into absorber 24. This gas stream comprises by mols nearly 50% of carbon dioxide and about 25% of hydrogen and carbon monoxide, the remainder being light hydrocarbon gases. The residual gases from a polymerization plant (referred to hereinafter) are mixed with the gases discharging from line 22 and the mixture is passed through absorber 24. The combined stream has a rate of flow of 820 mols.

The gases rising through absorber 24 flow countercurrently to the lean oil which is withdrawn through line 25 and passed successively through heat exchanger 26 and heater 27 into the lean oil still 28. Steam injected at the bottom of still 28 displaces the gaseous hydrocarbons which were scrubbed from the gases processed in absorber 24. The vapors leaving still 28 through line 29 pass through cooler 30 into separator 31 wherein condensed and uncondensed fractions are separated. Oil is returned by way of line 32 and pump 33 to the top of still 28, while a water layer is drawn off at the bottom of drum 31. The stripped oil flows from the bottom of still 28 through line 34. This oil is forced by pump 35 through heat exchanger 26 and cooler 36 to the top of absorber 24, thus completing the cyclic flow of the absorption medium. The residual gas leaving the top of absorber 24 flows at the rate of 705 mols and has a molecular weight of about 29.5. This gas is about 40% carbon dioxide. About one third of this stream is vented at 37 and two thirds are returned by way of line 38 to the recycle compressor 6. The vented gas has fuel value and may be utilized to provide heat in the plant or elsewhere.

The recovered gaseous hydrocarbons flowing from the top of separator 31 through line 39 have a molecular weight of about 45.3 and a rate of flow of 115 mols. This stream of somewhat more than 50% of carbon dioxide is mixed with the oil stream of line 21 and the mixture is passed through heater 40 wherein the temperature is raised to about 900° F. The heated stream is introduced into the bottom of treater 41 by way of line 42 at the rate of 155 mols. Preferably, the treater is of the type disclosed in my copending patent application, Serial No. 547,722, filed August 2, 1944, now Patent No. 2,445,327. This type of treater involves a unitary reactor in which a fluidized mass of a powdered treating catalyst, e. g., cyclocel, a bauxite catalyst sold by Attapulgus Clay Company of Philadelphia, is divided by an upright baffle into a conversion zone 43 and a contiguous combustion zone 44. The gaseous stream entering the bottom of treater 41 has an average molecular weight of 64.8 and contains somewhat less than 50% of carbon dioxide. This stream rises through conversion zone 43 at a velocity of about 1 foot per second and, desirably, the contact time is made 20 to 30 seconds. A stream of oxygen is supplied from plant 4 by way of line 45 to the combustion zone 44 of treater 41 in order to burn off any carbonaceous deposit formed on the catalyst during treatment of the gaseous hydrocarbons in zone 43. By maintaining different fluid-static heads, e. g., by producing different densities of the fluidized catalyst mass, in zones 43 and 44, cyclic flow of the fluidized catalyst through these zones is established. Oxygen is supplied to zone 44 at the rate of 17 mols and its velocity through zone 44 may be about 0.4 foot per second. With the aid of the heat of combustion liberated in zone 44 and the heat carried by the gases flowing through heater 40, a temperature of about 850° F. is maintained in zone 43. As a result of the catalytic treatment, oxygenated products are chemically dehydrated, i. e., molecules of water are split out of the oxygenated compounds, and a desirable amount of reforming of the heavier hydrocarbons is effected.

The reaction products along with the products of combustion which are largely carbon monoxide and carbon dioxide in the proportions of 1 and 2 volumes, respectively, leave the top of treater 41 through line 46. This effluent stream which has a molecular weight of about 56.5 enters the bottom of fractionator 47 at the rate of 200 mols. By mols, this stream is about 50% of carbon dioxide. Any catalyst entrained in the effluent gases from treater 41 is recovered as a slurry which is withdrawn from the bottom of fractionator 47 by way of line 48 and pump 49. Part of the oil-catalyst slurry is returned to treater 41 and part is passed through cooler 50 back into the fractionating column 47 by way of line 51. An oil stream is withdrawn from the upper portion of fractionator 47 through line 52 and discharged into stripping drum 53. Steam injected into the bottom of drum 53 displaces absorbed lighter hydrocarbons which return through line 54 to fractionator 47. The stripped oil which may be of Diesel fuel grade discharges through line 55 and cooler 56 to suitable storage facilities (not shown). This oil has a molecular weight of about 220 and is recovered at the rate of about 2.5 mols. The gases leaving the top of fractionator 47 pass through line 57 and cooler 58 into separator 59 wherein uncondensed gases are separated from liquid. The liquid forms a lower water layer which is withdrawn at the bottom of separator 59 and an oil layer which is partly returned by way of pump 60 and line 61 into the top of fractionator 47. The rest of the oil layer is forced by pump 62 and line 63 through heat exchanger 64 into the lower section of stabilizer 65. The uncondensed gases are withdrawn from the top of separator 59 by way of line 66 and injected into the upper portion of stabilizer 65 with the aid of compressor 67. The composite of streams 63 and 66 has an average molecular weight of 53.7 and a rate of flow of 190 mols. On a molar basis the composite has approximately 40% of carbon dioxide.

Stabilized gasoline is withdrawn from the bottom of stabilizer 65 by way of line 68 through heat exchanger 64 and cooler 69. The gasoline is recovered at the rate of 30 mols and has a molecular weight of about 120. Part of the stream withdrawn through line 68 is passed successively through pump 70 and heater 71 by way of line 72 back into the stabilizer 65 to provide the heat necessary for the fractionation. The gaseous stream leaving through line 73 at the top of stabilizer 65 passes through cooler 74 into separator 75 which removes uncondensed gases from a liquid fraction which is returned by way of line 76 and pump 77 to the top of the stabilizer 65. The uncondensed gases containing approximately 50% of carbon dioxide flow through line 78 at the rate of 160 mols into the bottom of absorber 79. This stream has an average molecular weight of 41.7 and contains valuable olefins predominantly in the $C_3$ and $C_4$ range.

Lean oil flowing countercurrently to the gases in absorber 79 is used to separate the hydrocarbons from the carbon dioxide and other gases.

The enriched oil stream is withdrawn through line 80 and passed successively through heat exchanger 81 and heater 82 into lean oil still 83 wherein the absorbed hydrocarbons are stripped from the lean oil by the injection of steam at the bottom of still 83. The stripped oil withdrawn through line 84 is forced by pump 85 through heat exchanger 81 and cooler 86 into the top of absorber 79 to effect the continuous cyclic flow of the absorption medium. The unabsorbed gases leaving the top of absorber 79 flow through line 87 into line 38. The gas flowing through line 87 discharges at the rate of 100 mols and has a molecular weight of 37.7, about two thirds of this gas being carbon dioxide. The combined streams 38 and 87 have a rate of flow of 580 mols and an average molecular weight of 30.8. The composite stream which is returned with the aid of compressor 6 as recycle gas to generator 2 comprises somewhat less than 50% of carbon dioxide and approximately 25% of hydrogen and carbon monoxide. The remaining 25% or so is made up of nitrogen, moisture and light gaseous hydrocarbons.

The effluent gases from still 83 pass through line 88 and cooler 89 into a separator 90 wherein uncondensed gases are separated from a liquid fraction. The liquid fraction forms a lower water layer which is withdrawn at the bottom of separator 90 and an oil layer which is returned by way of line 91 and pump 92 to the top of still 83 as reflux liquid. The gases discharging from the top of separator 90 are made to flow with the aid of compressor 93 through line 94 into heater 95. This stream which has a rate of flow of 60 mols and an average molecular weight of 47.9 is injected into the catalytic polymerization unit 96 at suitable temperature and pressure conditions to polymerize the gaseous olefins. The catalyst employed in polymerizer 96 may be any of several known types, e. g., the phosphoric acid type, and cooling surface 97 may be disposed within polymerizer 96 to remove the heat of reaction. Typical operating conditions would include a temperature of about 400° F., a pressure of about 900 lbs. per square inch gauge and a space velocity of about 500 volumes of gas per volume of catalyst per hour. The reaction products pass through line 98 and cooler 99 into stabilizer 100 wherein polymer gasoline is separated from light hydrocarbon gases and is withdrawn through line 101 and cooler 102 as an end product. This gasoline which, incidentally, contains a large butane fraction is recovered at the rate of 20 mols and has an average molecular weight of 83.8. Heat is supplied to stabilizer 100 by circulating liquid through line 103 and heater 104. Gases escaping from the top of stabilizer 100 pass through line 105 and cooler 106 into separator 107 wherein condensate is separated from the gases and returned by line 108 and pump 109 to the top of stabilizer 100. The gases leaving the top of separator 107 pass through pipe 23 into absorber 24 as hereinbefore described. These gases flow at the rate of 30 mols and have an average molecular weight of 31.9. While these gases comprise about 25% of carbon dioxide they also contain valuable light hydrocarbon gases which are recovered in absorber 24.

On the basis of pound mols per hour, a plant employing the rates of flow hereinabove stated has a daily production capacity of about 355 barrels of synthesized gasoline, 178 barrels of polymerized gasoline (containing butane) and 48 barrels of Diesel oil. The synthesized gasoline has an octane number of 76 or 77 by the A. S. T. M. test method (C. F. R.-motor). The composite resulting from blending the polymerized and synthesized gasolines has an octane rating of 80 or over.

Figure 2 presents schematically another plant arrangement in which my process may be operated. This operation in several respects is much the same as that hereinbefore described for Figure 1. Corresponding elements in the two drawings bear the same numerals; these corresponding elements may be identical or merely functionally equivalent.

To avoil redundancy, the flowsheet of Figure 2 will be discussed only to stress the more important departures from the flowsheet of Figure 1. In Figure 2, then, it will be observed that all of the product gases from reactor 9 flowing through line 18 are partly returned to reactor 9 by way of line 18A and compressor 18B and partly charged into heater 40 through line 18C. No separation of products has thus far been made.

The gaseous products raised to a desirable temperature in heater 40 are transferred to treater 41 through line 42. In this case, treater 41 is made up of two cylindrical vessels 43 and 44 in which, respectively, the catalytic treatment and catalyst regeneration are carried out. The two vessels are interconnected by internal standpipes 43A and 44A through which catalyst powder discharges from one vessel into the gaseous steam flowing to the other vessel. The catalyst circulates through the two vessels which embody "downflow" operation as described by Murphree et al. in Transactions of American Institute of Chemical Engineers, vol. 41, No. 1, page 19 et seq. (1945).

The gaseous effluents from vessels 43 and 44 flow as a mixture through line 46 into chamber 46A wherein catalyst entrained in the gases is recovered by scrubbing the gases with condensate. The condensate-catalyst slurry is drained from the bottom of chamber 46A and is forced by pump 46B partly back into vessel 43 by way of line 46C and partly through cooler 46D and line 46E to the top of chamber 46A.

The product gases leave chamber 46A through line 46F, passing through cooler 19 before discharging into separator 20. Thence, the products are passed through a conventional absorber system in much the same way as has been described for Figure 1. It is well to note that in this instance the oil fraction flowing from separator 20 through line 21 provides the absorption medium for absorber 24. The oil in line 21 meets the enriched medium discharging from absorber 24 through line 25. After the oil has been stripped of the lighter hydrocarbons in still 28, it flows through line 34. On passing through cooler 36, part of the oil is withdrawn as product through line 34A and part is returned to absorber 24.

The gaseous effluent from still 28 flows through line 29 and cooler 30 into separator 31. The condensate forms oil and water layers in separator 31, the water being drained from the bottom of the separator. The gaseous and oil fractions flow from separator 31 by way of lines 66 and 32A, respectively, into a conventional stabilizer 65, the operation of which has been outlined hereinabove in connection with Figure 1.

The gaseous hydrocarbons separated in stabilizer 65 leave separator 75 and are forced by compressor 93 through line 94 to an ordinary installation for polymerizing olefins chiefly in the $C_3$ and $C_4$ range. Such an installation has been discussed in relation to Figure 1.

The residual gases from the polymerization step are utilized as recycle gas by being led through line 23 into line 38 and thence with the aid of compressor 6 through line 7 into generator 2.

The flowsheets of Figures 1 and 2 show representative plant arrangements in which the process of my invention may be conducted to convert normally gaseous hydrocarbons into normally liquid hydrocarbons which form a major quantity of gasoline of high antiknock rating, say above 75 octane number, and a minor quantity of valuable oil, while effecting a high utilization efficiency for the gaseous hydrocarbon feed in terms of the liquid hydrocarbons produced. Many modifications of these flowsheets will suggest themselves to those skilled in the art. For example, in Figure 1, the gaseous effluent from separator 107 may be made to flow into the recycle line 38 instead of into absorber 24 by making the necessary changes in line 23. In effect, such an arrangement is shown in Figure 2. Similarly, the gaseous effluent from separator 31 may bypass treater 41 by connecting line 39 directly with line 66 which discharges into stabilizer 65. An important factor in the attainment of high utilization efficiency is the fact that synthesis gas is generated from gaseous hydrocarbons and high purity oxygen, i. e., not less than about 95% by volume of oxygen. In turn, this means that a minimum of extraneous matter enters the process and the by-stream of residual gases at various points in the operation may be collected and returned to the generator to utilize their contents of carbon oxides, hydrogen, methane, etc.

The synthetic product treatment step of my process may employ any of several contact agents, such as acid-treated clays and bauxite, synthetic cracking catalysts and activated alumina. My procedure of regenerating spent catalyst by burning off the carbonaceous deposit with oxygen makes it feasible to utilize this carbon which has been formed at the expense of gaseous hydrocarbons entering the process and which ordinarily when burning with air would be lost in the flue gases vented into the atmosphere. Accordingly, my procedure averts such loss and contributes to the attainment of a high utilization efficiency for the gaseous hydrocarbon feed. Furthermore, the absence of a large volume of atmospheric nitrogen permits the mixing of the gases leaving the conversion and regeneration zones of my catalytic treater. In a system embodying the fluidizing principle, such mixing obviates expensive catalyst separators, e. g., cyclone separators and electrical precipitators. The use of oxygen for catalyst regeneration also decreases the size of the equipment. Marked economies in installation and maintenance costs are therefore realized.

Those skilled in the regeneration of spent catalysts of the type contemplated for my dehydration step appreciate that the combustion of the carbonaceous deposit on the spent particles must be carried out below the deactivation temperature of the catalyst selected. The deactivation temperature, i. e., the point at which thermal injury or deactivation of the catalyst begins, varys with the catalyst used. Generally, the deactivation temperature is in the vicinity of about 1100° F., but some catalysts, e. g., the synthetic silica-alumina type, have deactivation temperatures as high as about 1300° F. In any case, however, the regeneration temperature should not be permitted to fall below about 800° F. In regenerating spent catalyst with substantially pure oxygen, I may use cooling coils or tubes to control the temperature within the desired limits but preferably, when using a fluidized system, I may effect thermal regulation through the control of the rates of oxygen introduction and of circulation of catalyst between the regenerating zone and a heat-abstracting zone, e. g., the endothermic conversion zone 43 of the drawings or a conventional cooler for fluidized catalysts.

While I have described a preferred form of my invention and modifications thereof, it is understood that these are by way of illustration only and various changes may be made within the scope of the appended claims without departing from the spirit of the invention.

What I claim is:

1. In the process for the manufacture of gasoline hydrocarbons by the generation of synthesis gas consisting essentially of carbon monoxide and hydrogen and by the catalytic conversion of said synthesis gas at elevated temperature and pressure to products including normally liquid hydrocarbons and carbon dioxide, the improvement which comprises passing in vapor phase said normally liquid hydrocarbons in the presence of at least about 2 mols of carbon dioxide for each mol of normally liquid hydrocarbon in contact with a solid, mineral-type contact agent, adapted to improve the antiknock value of gasoline hydrocarbons, in a treating zone at an elevated temperature to convert said normally liquid hydrocarbons to gasoline hydrocarbons of improved antiknock value, withdrawing a treated product stream from said treating zone, and recovering said gasoline hydrocarbons from said treated product stream.

2. The process of claim 1 wherein the solid, mineral-type contact agent is bauxite and the elevated temperature is in the range of about 700° to 950° F.

3. In the process for the manufacture of gasoline hydrocarbons by the generation of synthesis gas consisting essentially of carbon monoxide and hydrogen and by the conversion of said synthesis gas by contact with an iron-type catalyst at elevated temperature and pressure to products including normally liquid hydrocarbons and carbon dioxide, the improvement which comprises passing in vapor phase said normally liquid hydrocarbons in the presence of at least about 2 mols of carbon dioxide for each mol of normally liquid hydrocarbon in contact with bauxite in a treating zone at a temperature in the range of about 700° to 950° F. to convert said normally liquid hydrocarbons to gasoline hydrocarbons of improved antiknock value, withdrawing a treated product stream from said treating zone, and recovering said gasoline hydrocarbons from said treated product stream.

4. In the process for the manufacture of gasoline hydrocarbons by the generation of synthesis gas consisting essentially of carbon monoxide and hydrogen and by the catalytic conversion of said synthesis gas at elevated temperature and pressure to products including normally liquid hydrocarbons and carbon dioxide, the improvement which comprises passing the total stream of said products in vapor phase including at least about 2 mols of carbon dioxide for each mole of normally liquid hydrocarbon in contact with a solid, mineral type contact agent, adapted to improve the antiknock value of gasoline hydrocarbons, in a treating zone at an elevated temperature to convert said normally liquid hydrocarbons to gasoline hydrocarbons of improved antiknock value, withdrawing a treated product stream from said treating zone, and recovering said gasoline hydrocarbons from said treated product stream.

5. In the process for the manufacture of gasoline hydrocarbons by the generation of synthesis gas consisting essentially of carbon monoxide and hydrogen and by the conversion of said synthesis gas by contact with an iron-type catalyst at elevated temperature and pressure to products including normally liquid hydrocarbons and carbon dioxide, the improvement which comprises passing the total stream of said products in vapor phase including at least about 2 mols of carbon dioxide for each mol of normally liquid hydrocarbon in contact with bauxite in a treating zone at a temperature in the range of about 700° to 950° F. to convert said normally liquid hydrocarbons to gasoline hydrocarbons of improved antiknock value, withdrawing a treated product stream from said treating zone, and recovering said gasoline hydrocarbons from said treated product stream.

6. In the process for the manufacture of gasoline hydrocarbons by the steps including generating synthesis gas consisting essentially of carbon monoxide and hydrogen, reacting said synthesis gas in the presence of an iron-type catalyst at elevated temperature and pressure to yield products including normally liquid hydrocarbons and carbon dioxide, and treating said normally liquid hydrocarbons in vapor phase with a solid, mineral-type contact agent adapted to improve the antiknock value of gasoline hydrocarbons, said contact agent being fouled by the deposition of carbonaceous matter during said treatment but being reactivatable by the combustion of said carbonaceous matter, the improvement which comprises passing through said treatment step a stream comprising at least about 2 mols of carbon dioxide for each mol of normally liquid hydrocarbon present therein, reactivating said contact agent by combustion of said carbonaceous matter with substantially pure oxygen to yield combustion gases consisting essentially of carbon oxides, mixing said combustion gases and the effluent stream from said treatment step, recovering from the resulting mixture gasoline hydrocarbons of improved antiknock value and a gas fraction rich in carbon oxides, and utilizing a portion of said gas fraction in the step of generating synthesis gas.

7. In the process for the manufacture of gasoline hydrocarbons by the steps including generating synthesis gas consisting essentially of carbon monoxide and hydrogen, reacting said synthesis gas in the presence of an iron-type catalyst at elevated temperature and pressure to yield products including normally liquid hydrocarbons and carbon dioxide, and treating said normally liquid hydrocarbons in vapor phase with a solid, mineral-type contact agent adapted to improve the antiknock value of gasoline hydrocarbons, said contact agent being fouled by the deposition of carbonaceous matter during said treatment but being reactivatable by the combustion of said carbonaceous matter, the improvement which comprises passing the total stream of products from said reaction step including at least about 2 mols of carbon dioxide for each mol of normally liquid hydrocarbon through said treatment step, reactivating said contact agent by combustion of said carbonaceous matter with substantially pure oxygen to yield combustion gases consisting essentially of carbon oxides, mixing said combustion gases and the effluent stream from said treatment step, recovering from the resulting mixture gasoline hydrocarbons of improved antiknock value and a gas fraction rich in carbon oxides, and utilizing a portion of said gas fraction in the step of generating synthesis gas.

8. In the process for the manufacture of gasoline hydrocarbons by the generation of synthesis gas consisting essentially of carbon monoxide and hydrogen and by the catalytic conversion of said synthesis gas at elevated temperature and pressure to products including normally liquid hydrocarbons and carbon dioxide, the improvement which comprises passing in vapor phase said normally liquid hydrocarbons in the presence of carbon dioxide in a molal quantity at least as large as the molal quantity of said normally liquid hydrocarbons in contact with a solid, mineral-type contact agent, adapted to improve the antiknock value of gasoline hydrocarbons, in a treating zone at an elevated temperature to convert said normally liquid hydrocarbons to gasoline hydrocarbons of improved antiknock value, withdrawing a treated product stream from said treating zone, and recovering said gasoline hydrocarbons from said treated product stream.

PERCIVAL C. KEITH.

REFERENCES CITED

The following references are of record in the file of this patent:

UNITED STATES PATENTS

| Number | Name | Date |
| --- | --- | --- |
| 2,116,081 | Pier | May 3, 1938 |
| 2,178,824 | Atwell | Nov. 7, 1939 |
| 2,234,941 | Keith | Mar. 11, 1941 |
| 2,243,869 | Keith | June 3, 1941 |
| 2,248,196 | Plummer | July 8, 1941 |
| 2,264,427 | Asbury | Dec. 2, 1941 |
| 2,324,172 | Parkhurst | July 13, 1943 |
| 2,378,342 | Voorhees | June 12, 1945 |
| 2,400,075 | Claussen | May 14, 1946 |

OTHER REFERENCES

Ser. No. 392,639, Hagemann (A. P. C.), published June 22, 1943.